(12) United States Patent
Heiden et al.

(10) Patent No.: US 7,769,556 B2
(45) Date of Patent: Aug. 3, 2010

(54) METHOD FOR CORRECTING MEASURING ERRORS CAUSED BY THE LENS DISTORTION OF AN OBJECTIVE

(75) Inventors: Michael Heiden, Woelfersheim (DE); Klaus-Dieter Adam, Jena (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 87 days.

(21) Appl. No.: 12/231,481

(22) Filed: Sep. 3, 2008

(65) Prior Publication Data

US 2009/0070059 A1 Mar. 12, 2009

(30) Foreign Application Priority Data

Sep. 6, 2007 (DE) ........................ 10 2007 042 272

(51) Int. Cl.
*G06F 19/00* (2006.01)
*G01B 11/03* (2006.01)
*G06K 9/00* (2006.01)
*G01N 21/00* (2006.01)

(52) U.S. Cl. ..................... 702/95; 33/502; 382/144; 250/559.1; 356/239.2

(58) Field of Classification Search ................. 702/94, 702/95; 382/141, 154, 144; 356/124, 392.2; 430/5, 296; 250/208.1, 559.4; 33/502
See application file for complete search history.

(56) References Cited

U.S. PATENT DOCUMENTS

| | | | | |
|---|---|---|---|---|
| 5,825,483 | A | 10/1998 | Michael et al. | 356/243 |
| 6,167,355 | A | 12/2000 | Fiekowsky | 802/159 |
| 6,347,458 | B1 | 2/2002 | Kaczynski | 33/503 |
| 6,377,870 | B1 | 4/2002 | Blaesing-Bangert et al. | 700/245 |
| 6,960,755 | B2 | 11/2005 | Kaczynski | 250/221 |
| 2004/0120579 | A1 | 6/2004 | Cemic et al. | 382/209 |
| 2005/0014076 | A1* | 1/2005 | Omori | 430/5 |
| 2005/0254068 | A1 | 11/2005 | Rinn et al. | 356/625 |
| 2006/0277521 | A1 | 12/2006 | Chen et al. | 716/21 |

(Continued)

FOREIGN PATENT DOCUMENTS

DE  19858428  7/2000

(Continued)

OTHER PUBLICATIONS

Carola Blaesing:"Pattern Placement Metrology for Mask Making," presented by Dr. Carole Bläsing at the Semicon meeting, Education Program in Geneva, Switzerland on Mar. 31, 1998, 11 pages.

(Continued)

*Primary Examiner*—Bryan Bui
(74) *Attorney, Agent, or Firm*—Davidson, Davidson & Kappel, LLC

(57) ABSTRACT

A method for correcting the measuring errors caused by the lens distortion of an objective in a coordinate measuring machine is disclosed. For a plurality of different types of structures, the lens distortion caused by an objective is determined in an image field of the objective. The position of a type of structure is determined in the image field of the objective by a measuring window. The correction of the lens distortion required for the type of structure to be measured is retrieved from the database as a function of the type of structure to be measured.

8 Claims, 6 Drawing Sheets

U.S. PATENT DOCUMENTS

2008/0295348 A1* 12/2008 Heiden et al. .................. 33/502

FOREIGN PATENT DOCUMENTS

| DE | 19949005 | 5/2001 |
|---|---|---|
| DE | 10106699 | 8/2002 |
| DE | 10257323 | 7/2004 |
| DE | 102004023739 | 12/2005 |

OTHER PUBLICATIONS

William Broadbent et al.: "Results from a new die-to-database reticle inspection platform," Proceedings of SPIE, vol. 6518, "Metrology, Inspection, and Process Control for Microlithography" XXI, 651821, 10 Seiten, Apr. 2007.

* cited by examiner

METHOD FOR CORRECTING MEASURING ERRORS CAUSED BY THE LENS DISTORTION OF AN OBJECTIVE

This claims the benefits of German Patent Application No. 10 2007 042 272.7, filed on Sep. 6, 2007, and hereby incorporated herein.

The present invention relates to a method for correcting measuring errors caused by the lens distortion of an objective in a coordinate measuring machine.

BACKGROUND

U.S. Pat. No. 6,167,335 discloses a system for measuring the dimensions of particles. The system is an automatic inspection device allowing microscopic dimensions, such as the area, diameter, height, and line width of defects and lines of a photographic mask to be measured. It is, however, not a coordinate measuring machine for determining the positions of structures relative to a coordinate system of the coordinate measuring machine.

U.S. Pat. No. 5,825,483 discloses a plate for calibrating the angle of vision. This plate is used in the manufacture of semiconductors. The plate is not suitable, however, for measuring positions of structures on a substrate.

U.S. Patent Application No. 2006/0277521 A1 discloses a method of lithography referred to as double exposure. Measurement of the positions of structures for double exposure is not envisaged.

In the article by William BROADBEN, et. al. "Results from a new die-to-die database reticle inspection platform" in proceedings of SPIE Vol. 6518 Metrology Inspection, and Process Control for Microlithography XXI, 651821, 10 pages, April 2007, there is no reference to the determination of the positions of structures on the surface of a mask.

German Patent Application DE 102 57 323 A1 discloses a method and a microscope for detecting images of an object. This only refers to issues of evaluation arising when line arrays, for example, are imaged.

A coordinate measuring machine for measuring structures on wafers and masks used for their manufacture is known from the presentation paper "Pattern Placement Metrology for Mask Making" by Dr. Carola Bläsing. The paper was held at the Semicon Education Program Convention in Geneva on Mar. 31, 1998. The description given there is the basis for a coordinate measuring machine of which various models are commercially available.

Further, a coordinate measuring machine is known from a plurality of patent applications, such as DE 19949005, DE 19858428, DE 10106699 or DE 102004023739. In all documents from the state of the art a coordinate measuring machine is disclosed allowing structures to be measured on a substrate. Herein, the substrate is placed on a measuring stage traversable in the X coordinate direction and Y coordinate direction. The coordinate measuring machine is configured in such a way that the positions of structures, such as the edges of structures, can be determined by means of an objective. For determining the positions of structures, or their edges, it is necessary to determine the position of the measuring stage by means of at least one interferometer. Finally the position of the edge is determined in relation to a coordinate system of the measuring machine.

SUMMARY OF THE INVENTION

To be able to determine precisely the position of an edge of a structure, the lens distortion caused by the objective also has to be taken into account. Currently, the lens distortion is only trained by means of one line width and a single form of the structure. With the requirements as to the precision of a coordinate measuring machine becoming ever more stringent, or the structures, or the distances between the structures, becoming ever smaller, it is useful if the lens distortion is also trained with other structures, or structure forms and line widths.

It is an object of the present invention to provide a method allowing the measuring values of positions of structures, or edges of structures obtained by a coordinate measuring machine to be corrected with respect to the distortion of the measuring values caused by the lens distortion of an objective (lens arrangement).

The present invention provides a method comprising the steps of:

using the objective of a coordinate measuring machine to measure structures on a surface of a mask, wherein the mask is inserted in a measuring stage, which is moveable in a X coordinate direction and a Y coordinate direction, so that different areas of the mask are traversed into an image window of the objective;

determining the lens distortion caused by the objective for a plurality of different types of structures on the mask in the image window of the objective;

measuring one structure of one type each time within the image window of the objective successively in different locations within the image window to measure the position of the structure; wherein the position of the structure of one type is determined with a measuring window of a detector successively within the image window of the objective;

storing the lens distortion obtained for each type of the structure (3) in a database;

determining the position of a structure of one type with the measuring window in the image window of the objective;

retrieving, in dependence on the type of structure measured, the correction of the lens distortion required for it, from the database; and correcting the position of the structure measured through the measuring window in the image window of the objective by the lens distortion at this position.

The method for correcting the measuring values caused by the lens distortion of an objective in a coordinate measuring machine is advantageous because the lens distortion caused by the objective is determined for a plurality of different types of structures, for each type of structure in an image window of an objective. The lens distortion determined for each type of structure is stored in a database. A measuring window is used to determine the position of the structure of one type in the image window of the objective. The position of the structure measured through the measuring window is corrected by the lens distortion at this position of the measuring window.

For this purpose the lens distortion necessary for correction can be retrieved from the database by a user. The user knows the type of structure currently being measured by means of the coordinate measuring machine and can therefore retrieve the lens distortion associated with each type of structure from the database.

The user of the coordinate measuring machine determines which correction of the lens distortion is used for the type of structure currently being measured by the coordinate measuring machine.

It is also possible for the type of structure currently being measured to be determined by means of pattern detection.

Based on the result of the pattern detection, the correction required for the type of structure in question is automatically retrieved from the database.

The corrections of the lens distortion in the X coordinate direction and Y coordinate direction are stored as numerical-value pairs at each measuring position of each type of structure in the image window of the objective. The numerical value in the X coordinate direction and/or in the Y coordinate direction required for correction will be retrieved from the database as a function of the measuring position of the measuring window used for determining the position of the structure, or the position of one of the edges of the structure. An interpolation between at least two adjacent numerical-value pairs can also be carried out if the position of the structure measured by means of the measuring window does not coincide with a measuring position for determining the numerical-value pairs for correcting the lens distortion.

The correction of the lens distortion can be represented as a function in both the X coordinate direction and Y coordinate direction. In those positions in which the measurement is carried out in the image window of the objective for each structure, the functions have support points. The functions are fitted to these support points. The values for correction predetermined by means of the function will be retrieved from the database in correspondence with the measuring position of a structure.

The correction of the lens distortion in the X coordinate direction and the Y coordinate direction can be represented as a two-dimensional vector field in the image window of the objective.

BRIEF DESCRIPTION OF THE DRAWINGS

Exemplary embodiments of the invention and their advantages will be described in more detail with reference to the accompanying drawings, in which.

DETAILED DESCRIPTION

Figure 1:
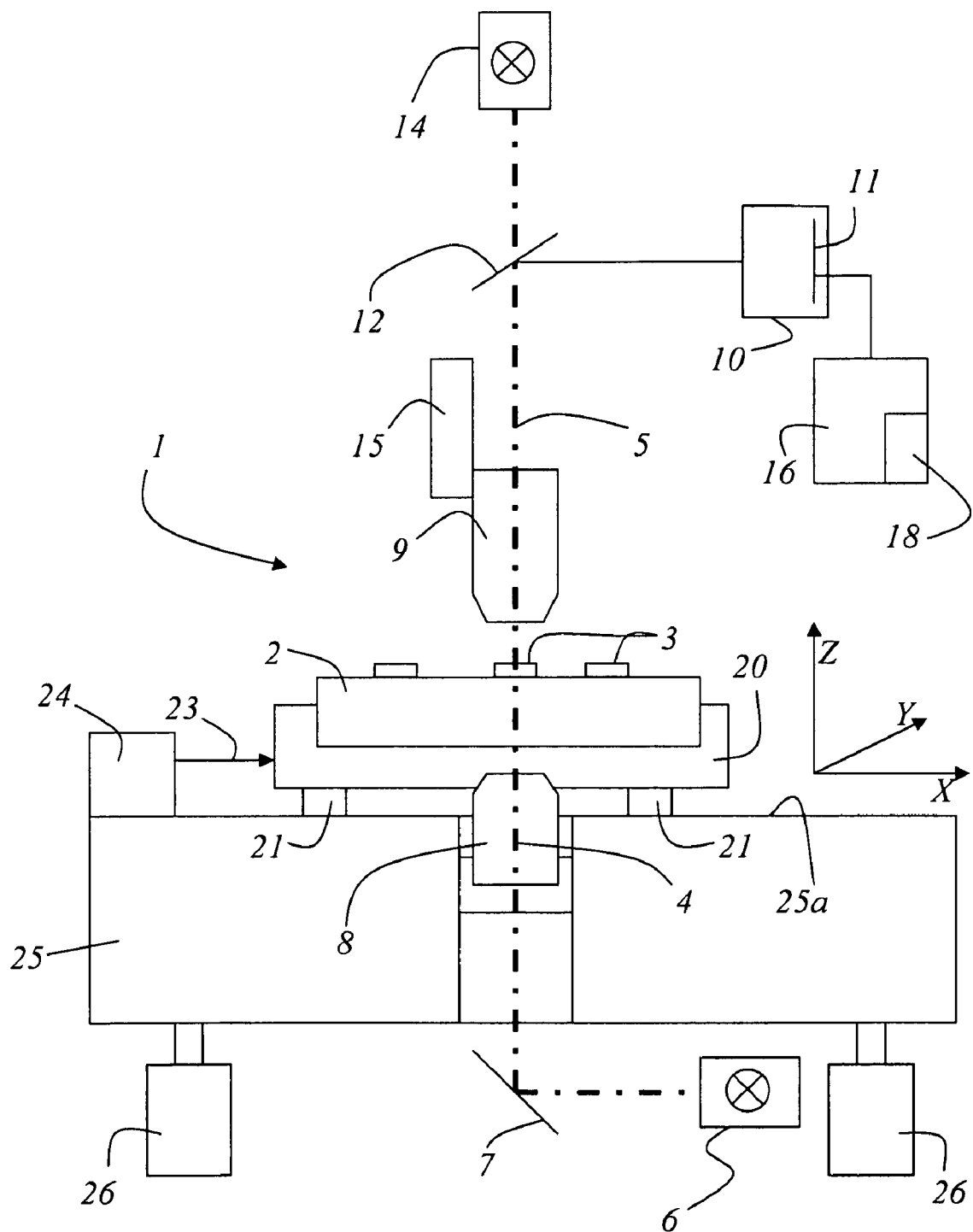
FIG. 1 is a schematic representation of a coordinate measuring device, in which the method of the present invention is used.

FIG. 1 is a schematic view of a coordinate measuring machine 1, in which the method according to the present invention can be used. Mask 2, carrying on its surface structure 3 to be measured, is placed in a measuring stage 20 which is arranged to be moved in the X coordinate direction and Y coordinate direction in a plane 25a. Plane 25a is defined by a block 25. Block 25 is formed by a granite block in a preferred embodiment. Block 25 being of granite should not be construed, however, as a limitation to the present invention. It goes without saying for a person skilled in the art that plane 25a, within which measuring stage 20 is moveable, can be provided by any suitable material. The moveability of measuring stage 20 is achieved by means of suitable bearings 21. In a preferred embodiment, bearings 21 are formed as air bearings. The position of measuring stage 20 within plane 25a is measured by means of at least one laser interferometer 24. For measuring the position of the measuring stage, the laser interferometer directs a laser beam 23 onto the measuring stage. Although only one laser interferometer 24 is shown here, this should not be construed as a limitation to the present invention. It goes without saying for a person skilled in the art that each moveable element of a coordinate measuring machine may be monitored in view of its position in space by means of a laser interferometer.

For illuminating mask 2, in coordinate measuring machine 1, a transmitted-light illumination means 6 and an incident-light illumination means 14 are provided. From transmitted-light illumination means 6, the illumination light is directed onto mask 2 via a reflection mirror 7 and a condenser 8. From incident-light illumination means 14, the light of incident-light illumination means 14 is directed along an incident-light illumination beam path 5 via objective 9 onto mask 2. By means of an adjustment unit 15, objective 9 can be adjusted in the Z coordinate direction. Objective 9 collects the light coming from mask 2 and directs it via a beam splitting mirror 12 onto a detector 10 provided with a detector chip 11. The output of the detector chip is connected to a computer 16 containing a memory 18. The computer digitizes the image signals recorded by detector 10 and passes them on to computer 16 for further processing. Corresponding correction data can be stored in memory 18 of computer 16. Usually the correction data are organized in the form of a database structure in the computer. The entire coordinate measuring machine 1 rests on vibration dampers 26 so that building vibrations or vibrations of the environment are damped ensuring that the measuring values are not falsified by vibrations.

Figure 2:
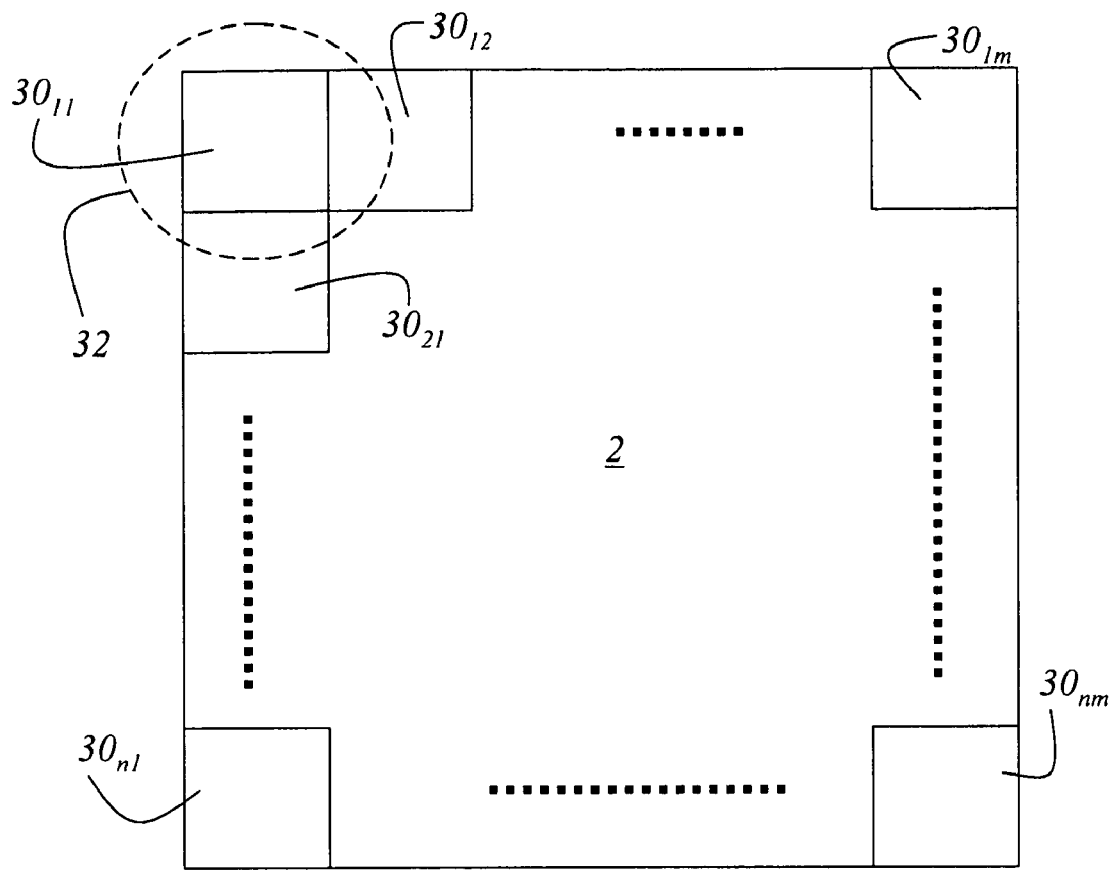
FIG. 2 schematically shows a mask for semiconductor manufacture on which the individual dies are arranged for projection onto the wafer.
Figure 3:
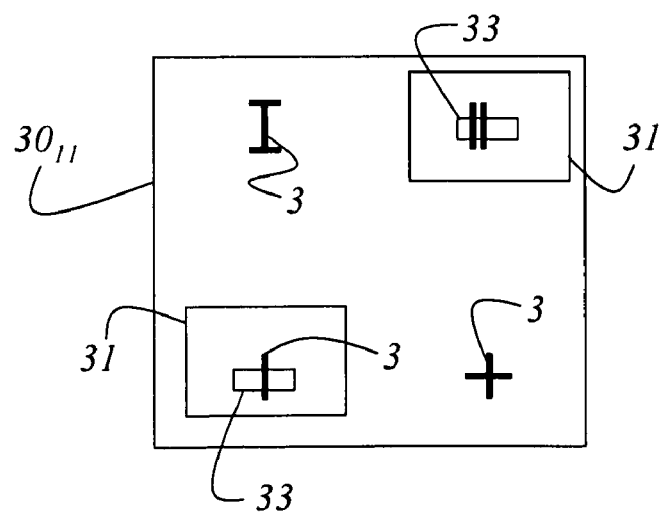
FIG. 3 shows an enlarged view of the die indicated by a broken-line circle in FIG. 2.

FIG. 2 is a schematic view of a mask 2 carrying a plurality of dies $30_{11}$, $30_{12}$ ... $30_{NM}$. The individual dies are imaged onto the surface of a wafer by means of a stepper. The structures bearing the individual dies are developed in a photoresist applied to the wafer. FIG. 3 is an enlarged schematic view of a die indicated by broken-line circle 32 in FIG. 2. Die $30_{11}$ can bear a plurality of different structures. In the embodiment shown here, which must not be construed as a limitation to the present invention, the individual structures are lines, crosses, double lines and H-structures. Generally those structures are present on a die which later form the electric circuits in a wafer. It goes without saying for a person skilled in the art that these structures can have a wide variety of forms. For measuring the position of the individual structures within the mask, or within the die, the image window 31 of the objective is positioned in such a way that the structure to be measured comes to lie within image window 31 of objective 9. CCD chip 11 of detector 10 has defined a measuring window comprising the structure to be measured. The distortion of objective 9 now has an effect on determining the position of the edges of the various structures. Ultimately it is necessary that the positions of structures or the positions of the edges of structures measured by means of coordinate measuring machine 1 are corrected with respect to their lens distortion. Depending on each type of structure (four different types of structures are shown in FIG. 3) the lens distortion has a different effect. This means, that different measuring values with respect to the position of the structure and the position of the edges of each structure are obtained for the individual types of structures.

Figure 4:
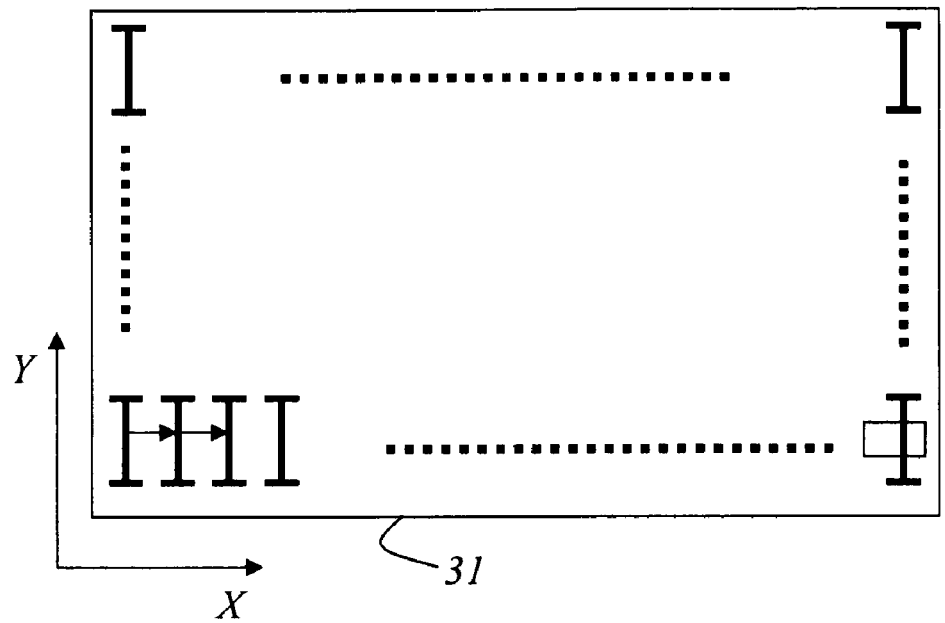
FIG. 4 is a schematic view of the image window of the objective used, wherein a structure is successively traversed within the image window, so that at each position of the structure within the image window the position is measured in the X coordinate direction.
Figure 5:
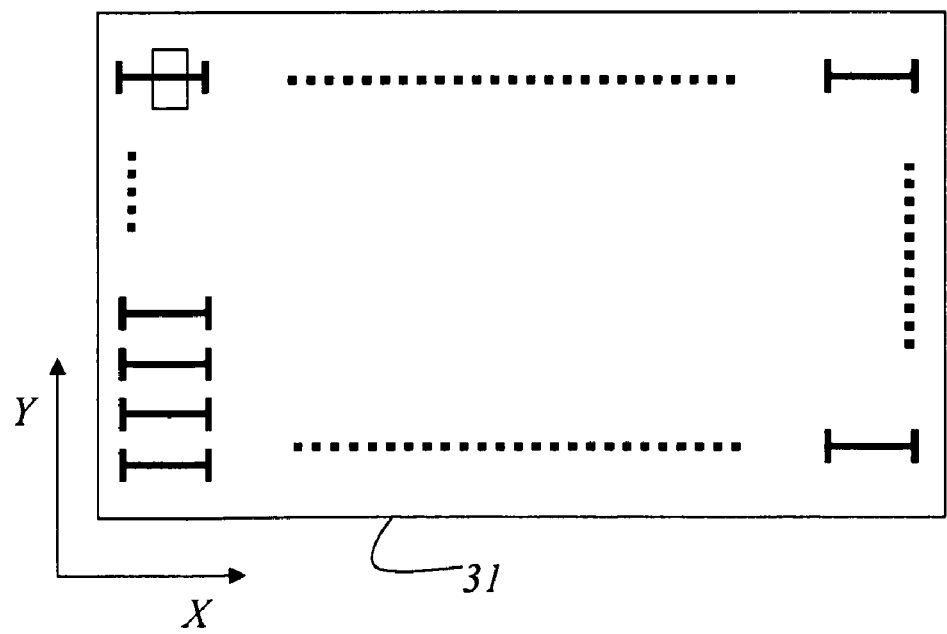
FIG. 5 shows the same view as in FIG. 4, wherein, however, the position of the structure is measured in the Y coordinate direction.

FIGS. 4 and 5 show how the lens distortion is obtained for a type of structure. In the embodiment shown here, the type of structure is an H-structure. Structure 3 is measured at successively changing positions within image window 31 of objective 9 in the view of FIG. 4. In the embodiment shown in FIG. 4, measuring stage 20 is traversed in the X coordinate direction so that structure 3 always comes to lie at a different position within image window 31 of objective 9. At each position of the structure within the image window, the position of the structure is determined by means of measuring window 33. In FIG. 5 the measuring values for the position of structure 3 in the Y coordinate direction are determined by means of measuring window 33 within image window 31 of the objective. Due to the lens distortion, different measuring values result as a function of the position of structure 3 within image window 31 of objective 9. The different measuring values result in the X coordinate direction and the Y coordinate direction.

Figure 6:
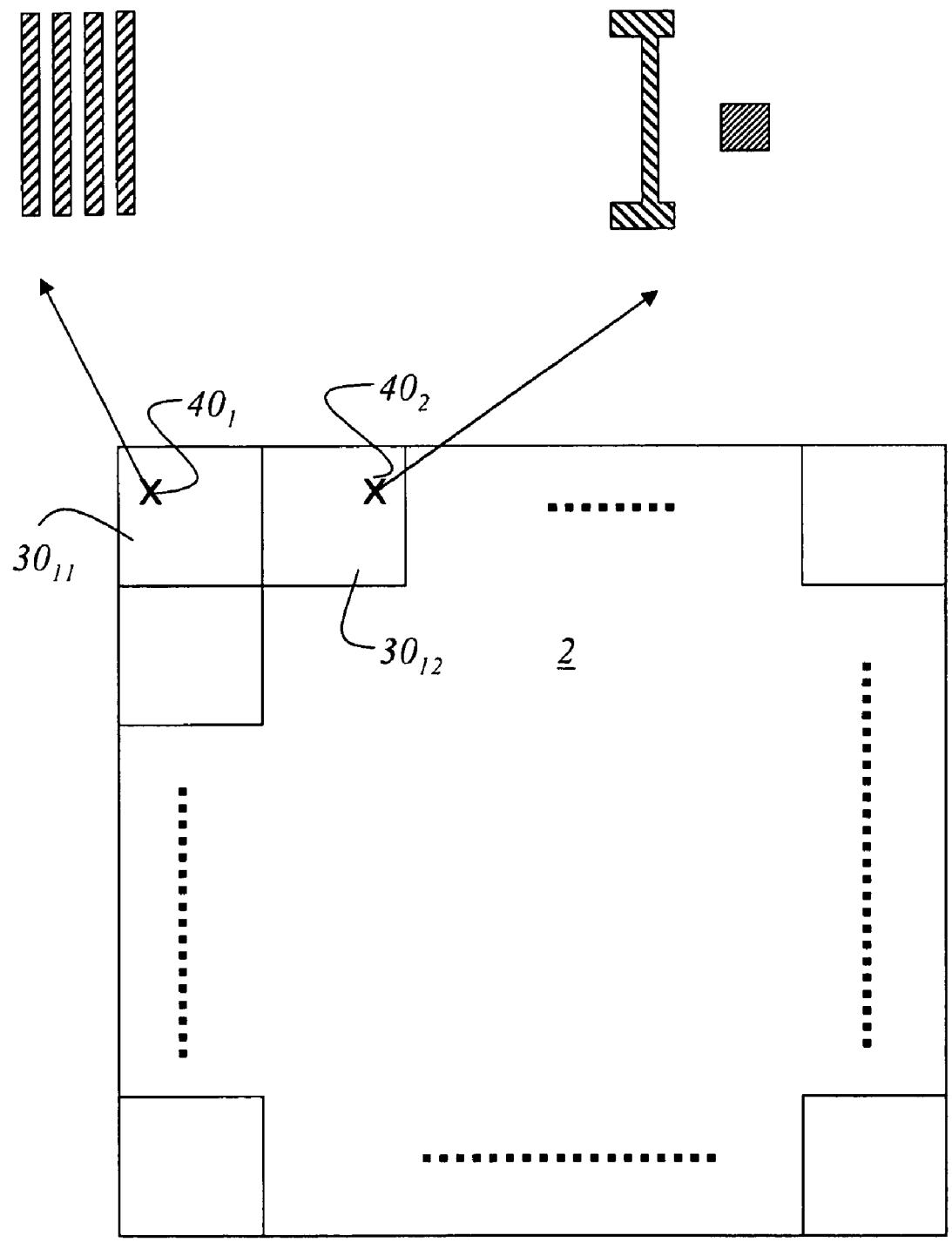
FIG. 6 also shows an enlarged view of a mask, wherein various types of structures are measured with respect to their position within the dies on the mask.

FIG. 6 also shows a schematic view of mask 2, wherein different positions on the dies are indicated with a cross. In die $30_{11}$, at the first position $40_1$, the structures to be measured are present as density line structures. At the second position $40_2$, of the second die $30_{12}$, other structures are present, the positions or widths of which are to be measured. The structure present at position $40_2$ is an H-structure and a contact hole. As already mentioned above, different measuring values with respect to the position of each structure and with respect to the width of each structure will result for these different types of structures to be measured due to the lens distortion.

Figure 7:
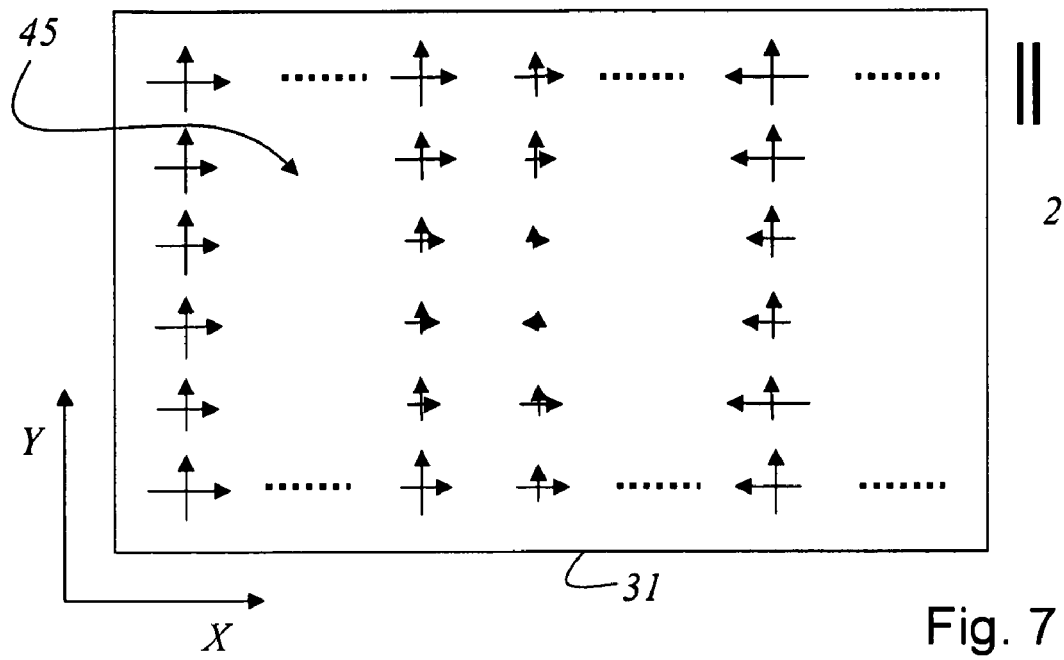
FIG. 7 shows in an exemplary manner a vector field within the image window of the objective determined by means of the method shown in FIGS. 3 and 4.

FIG. 7 is a graphical representation of the lens distortion obtained within image window 31 of objective 9. The lens distortion was derived from structure 2. In the embodiment shown here, the type of structure 2 is a double-line structure. There are various possibilities to represent the lens distortion. In FIG. 7, the lens distortion is represented as a vector field 45. Herein, the individual vectors are the amount by which the values measured with respect to the position of a structure must be corrected so that the lens distortion does not have an effect on the measured values. As initially mentioned, a corresponding lens distortion must be obtained for each type of structure. The distortions or lens distortions determined for the various types of structures are stored in the database in computer 16. Depending on each type of structure measured by coordinate measuring machine 1, the desired correction can therefore be called up. Since the position of the structure within image window 31 of objective 9 is known, it is thus also possible to retrieve, or select, the correction corresponding to this position. Although the lens distortion is shown as a vector field in the embodiment shown in FIG. 7, this must not be construed as a limitation to the present invention. The lens distortion can also be represented as a two-dimensional matrix of numerical values or as a two-dimensional function. In the case of a two-dimensional function, the positions, at which the lens distortion has been obtained, are the support points of each function in the X coordinate direction and/or the Y coordinate direction.

Figures 8A, 8B:
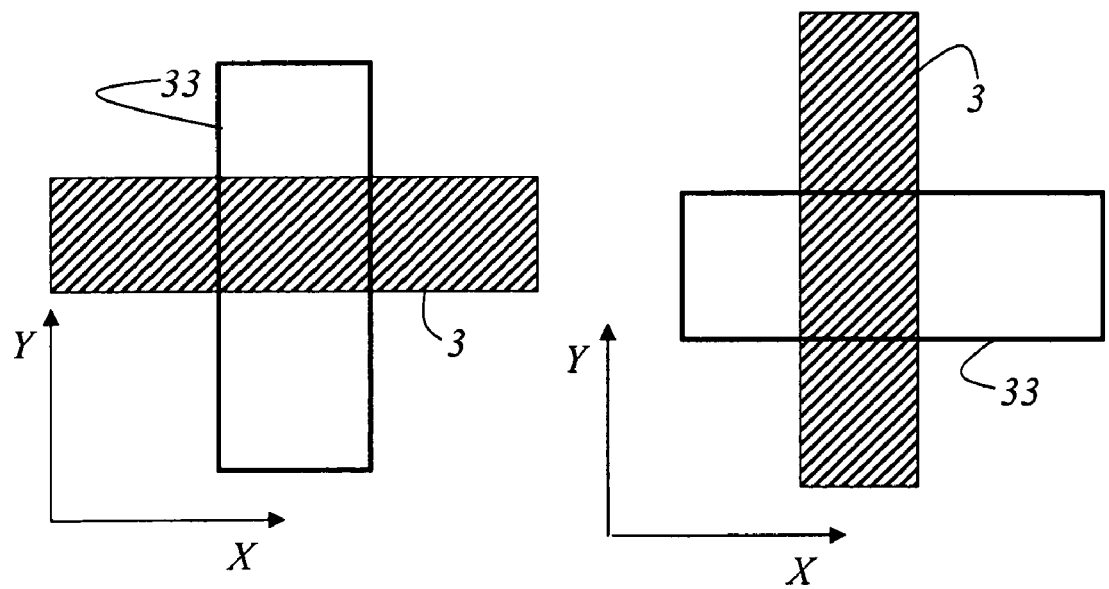
FIG. 8a is a schematic representation showing the determination of the position of a structure in the Y coordinate direction by means of a measuring window within the image window of the objective.
FIG. 8b shows the determination of the position of a structure in the X coordinate direction by means of a measuring window within the image window of the objective.

FIG. 8a and FIG. 8b schematically show the process of measuring the position of a structure 2. In FIG. 8a, the position of structure 2 is determined in relation to the Y coordinate direction. For this purpose, structure 2 to be measured is positioned in the measuring field of detector 10 of coordinate measuring machine 1. In the case shown in FIG. 8b, the position of structure 2 is determined in the X coordinate direction. Again, measuring window 33 of detector 10 is positioned in such a way that structure 2 extends within measuring window 33.

Figure 9:
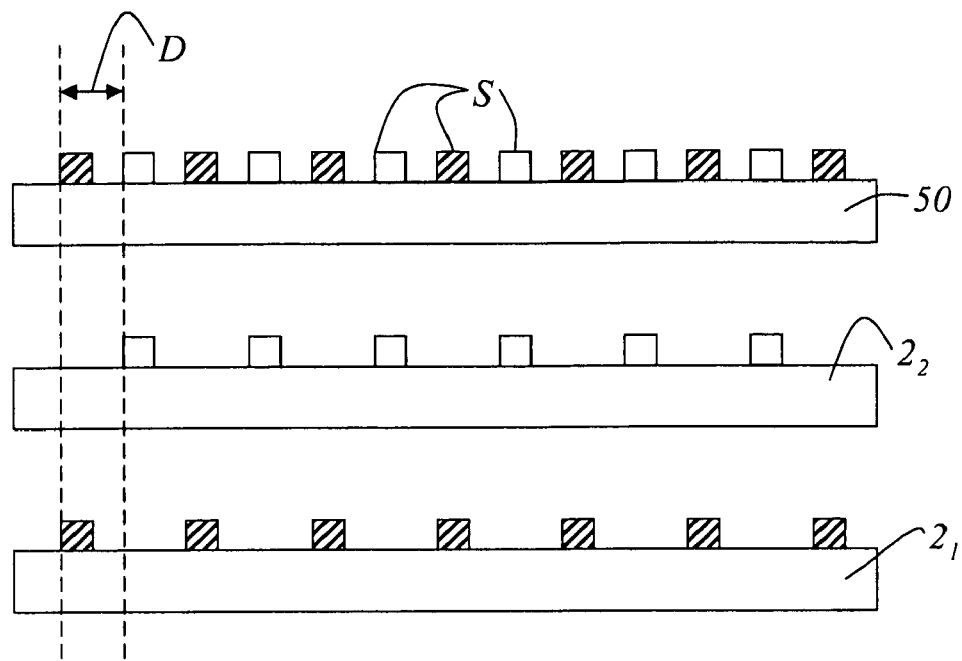
FIG. 9 shows the schematic application of overlay masks and the result derived from the application of the overlay masks on an exposed wafer (double exposure)
Figure 10A:
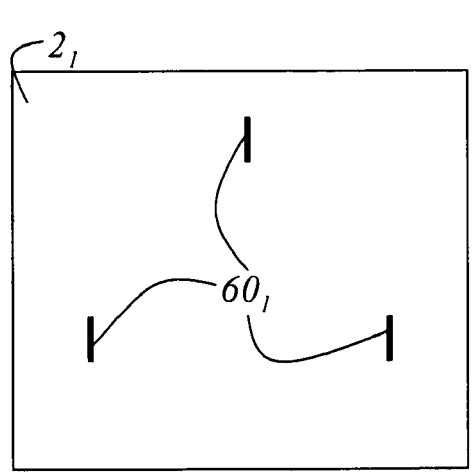
FIG. 10a is a schematic view of the first overlay mask provided with alignment marks.
Figure 10B:
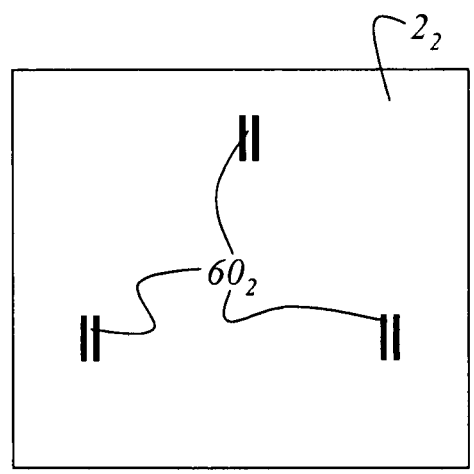
FIG. 10b is a schematic view of the second overlay mask provided with another type of alignment marks.

In FIG. 9, overlay masks are schematically shown, in which the correction method is particularly utilized with respect to the lens distortion. Since distance D between structures S on wafer 50 should become increasingly smaller, wafer 50 is first exposed with a first mask $2_1$ and then with a second mask $2_2$. This method is referred to as double exposure. A modified method is called double patterning. As can be clearly seen from FIG. 9, the structures provided on mask $2_1$ are displaced with respect to the structures provided on mask $2_2$ by distance D. After exposing the two masks $2_1$ and $2_2$ on wafer 50, an image is therefore obtained, in which individual structures 3 have the distance D. To achieve this, alignment marks $60_1$ are applied to first mask $2_1$, as shown in FIG. 10a. Other alignment marks $60_2$ are applied on second mask $2_2$, as shown in FIG. 10b. On first mask $2_1$, alignment marks 60, are simple lines. On second mask $2_2$, alignment marks $60_2$ are double lines. When the wafer is now exposed, it is a question of positioning these alignment marks on top of each other in such a way that the lines of first mask $2_1$ are always disposed in the gaps between the double lines of second mask $2_2$. This is the only way to ensure that the structure intended on wafer 50 will result. Before exposing wafer 50 with masks $2_1$ and $2_2$, it is necessary to precisely know the quality in which masks $2_1$ and $2_2$ have been produced. For this purpose it is also necessary to determine the position of alignment marks $60_1$ and $60_2$. Thus it is also necessary for the alignment marks $60_1$ and $60_2$ to be different in type so that for determining the position of these alignment marks $60_1$ and $60_2$ in determining their position and the correction of the measuring values necessary therefore, a lens distortion adapted to the type of alignment mark is adopted. This is the only way to ensure that the precise position of the different types of structures of the different alignment marks can be checked on the various masks and therefore a comparison can be made against the manufacturers' specifications.

The present invention has been described in relation to preferred embodiments. It is conceivable, however, that changes and modifications of the present invention can be made without departing from the scope of protection of the appended claims. In particular, the structures shown are only examples without limitation as to their general applicability. The type of structures on the masks depends on the electric circuits which are to be ultimately applied to the wafer.

What is claimed is:

1. A method for correcting the measuring errors caused by a lens distortion of an objective comprising the following steps:

using the objective of a coordinate measuring machine to measure structures on a surface of a mask, the mask being inserted in a measuring stage moveable in a X coordinate direction and a Y coordinate direction, so that different areas of the mask are traversed into an image window of the objective;

determining the lens distortion caused by the objective for a plurality of different types of structures on the mask in the image window of the objective;

measuring one structure of one type each time within the image window of the objective successively in different locations within the image window to measure the position of the structure, the position of the structure of one type being determined with a measuring window of a detector successively within the image window of the objective;

storing the lens distortion obtained for each type of the structure in a database; determining the position of the structure of one type with the measuring window in the image window of the objective;

retrieving, in dependence on the type of structure measured, the correction of the lens distortion required for the type of structure, from the database; and correcting the position of the structure measured through the measuring window in the image window of the objective by the lens distortion at the position.

2. The method according to claim 1, wherein the lens distortion required for correction is retrieved from the database by a user.

3. The method according to claim 1, wherein a user of the coordinate measuring machine determines which correction of the lens distortion is used for the type of structure currently measured by the coordinate measuring machine.

4. The method according to claim 1, wherein the type of structure currently to be measured is determined by pattern recognition and in that, based on the result of the pattern recognition, the correction of the lens distortion required for this type of structure is automatically retrieved from the database.

5. The method according to claim 1, wherein the correction of the lens distortion in the X coordinate direction and the Y coordinate direction is stored as numerical-value pairs at each measuring position of each type of structure in the image window of the objective.

6. The method according to claim 5, wherein an interpolation is carried out between at least two adjacent numerical-value pairs if the position of the structure measured by the measuring window does not coincide with a measuring position during the determination of numerical-value pairs for correcting the lens distortion.

7. The method according to claim 1, wherein the correction of the lens distortion in the X coordinate direction and the Y coordinate direction is always represented as a function, which is fitted to the data obtained during measuring each type of structure in the image window of the objective.

8. The method according to claim 1, wherein the correction of the lens distortion in the X coordinate direction and the Y coordinate direction is represented as a two-dimensional vector field.

* * * * *